Nov. 1, 1938.  E. ROGGENSTEIN  2,135,220
TYPEWRITER PUNCH COMBINATION
Filed Oct. 3, 1935  10 Sheets-Sheet 3

WITNESSES
Harris D Hinchin
A. Mantini

INVENTOR.
E. ROGGENSTEIN
BY W. A. Sparks
ATTORNEY

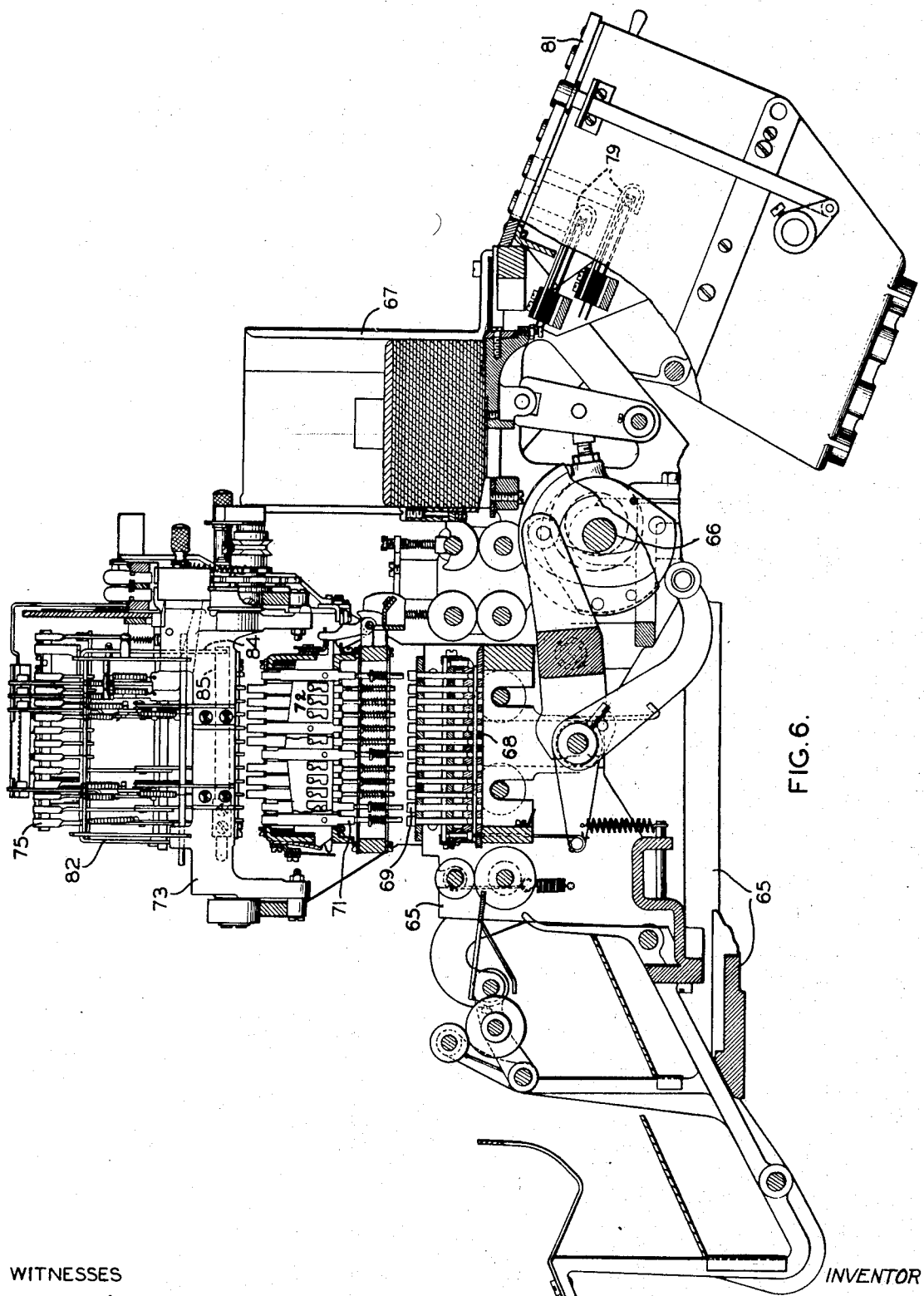

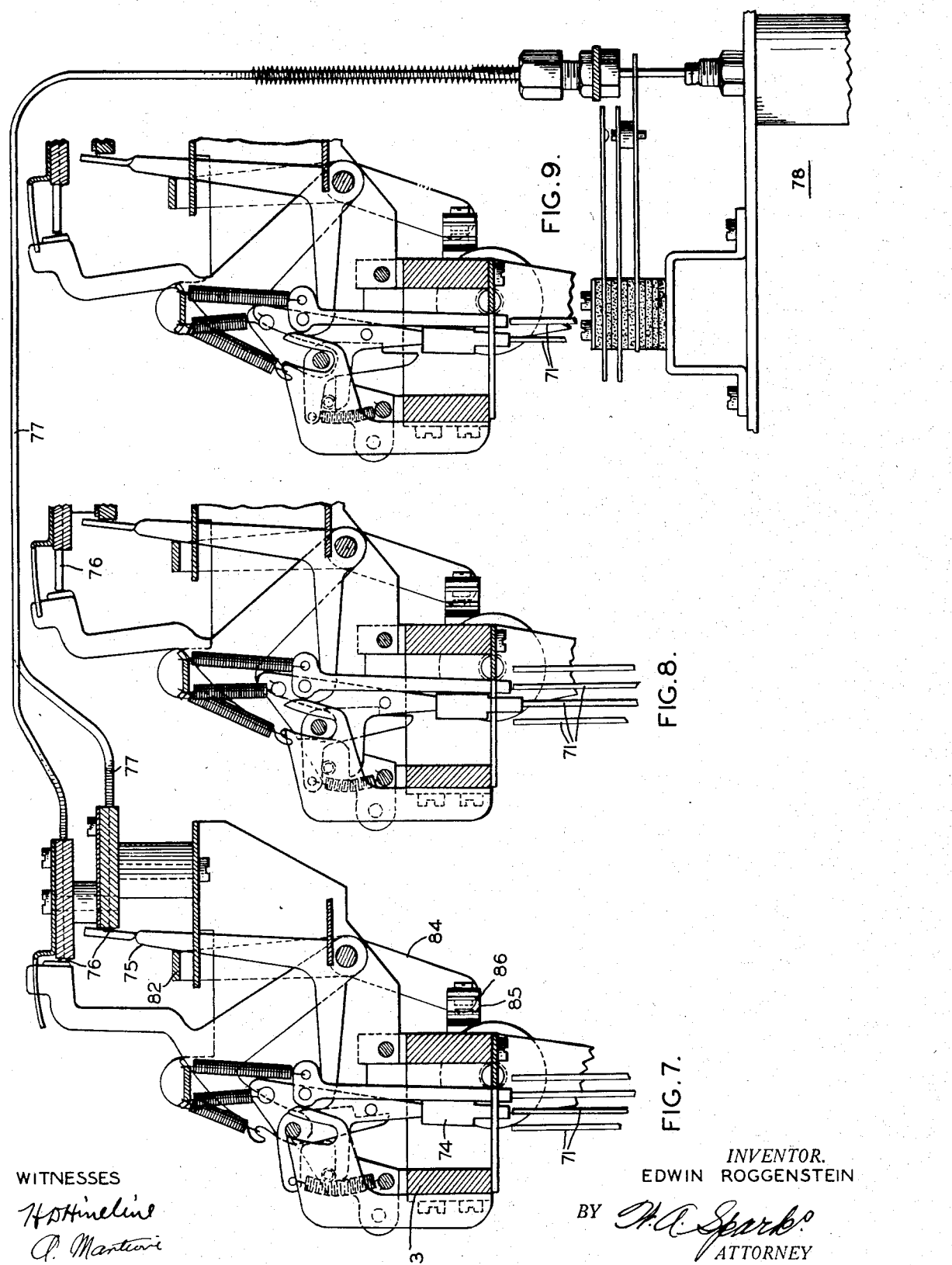

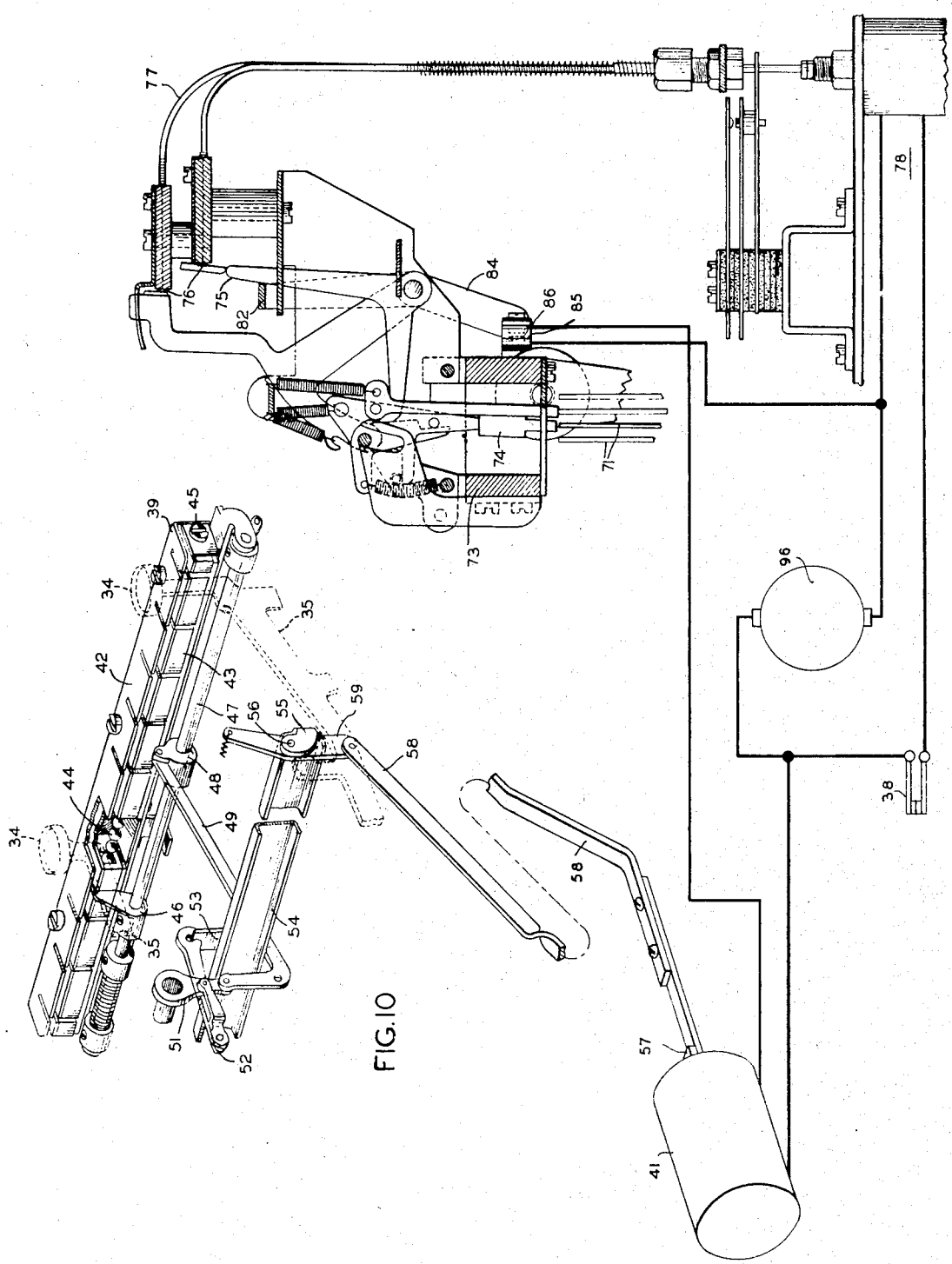

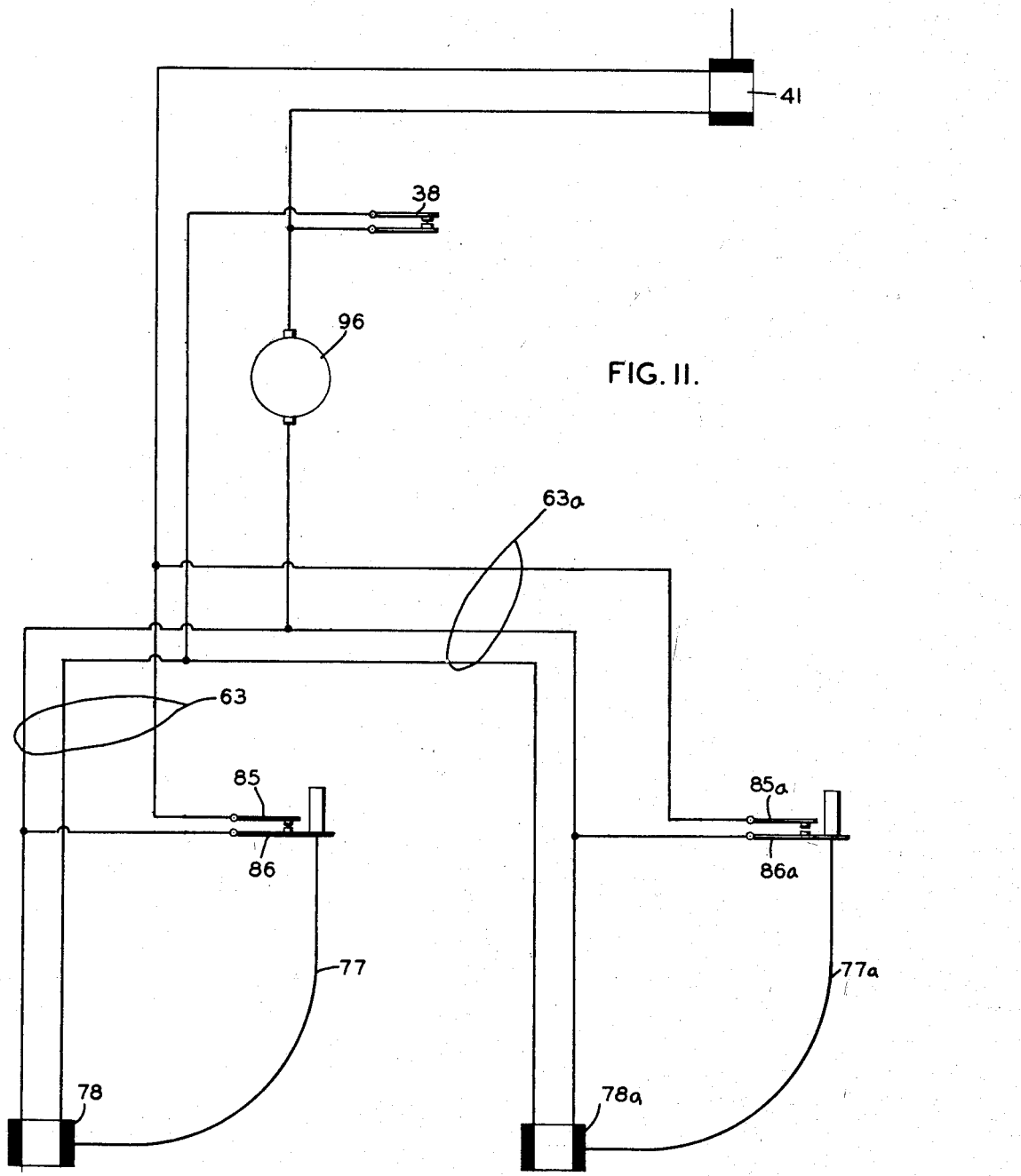

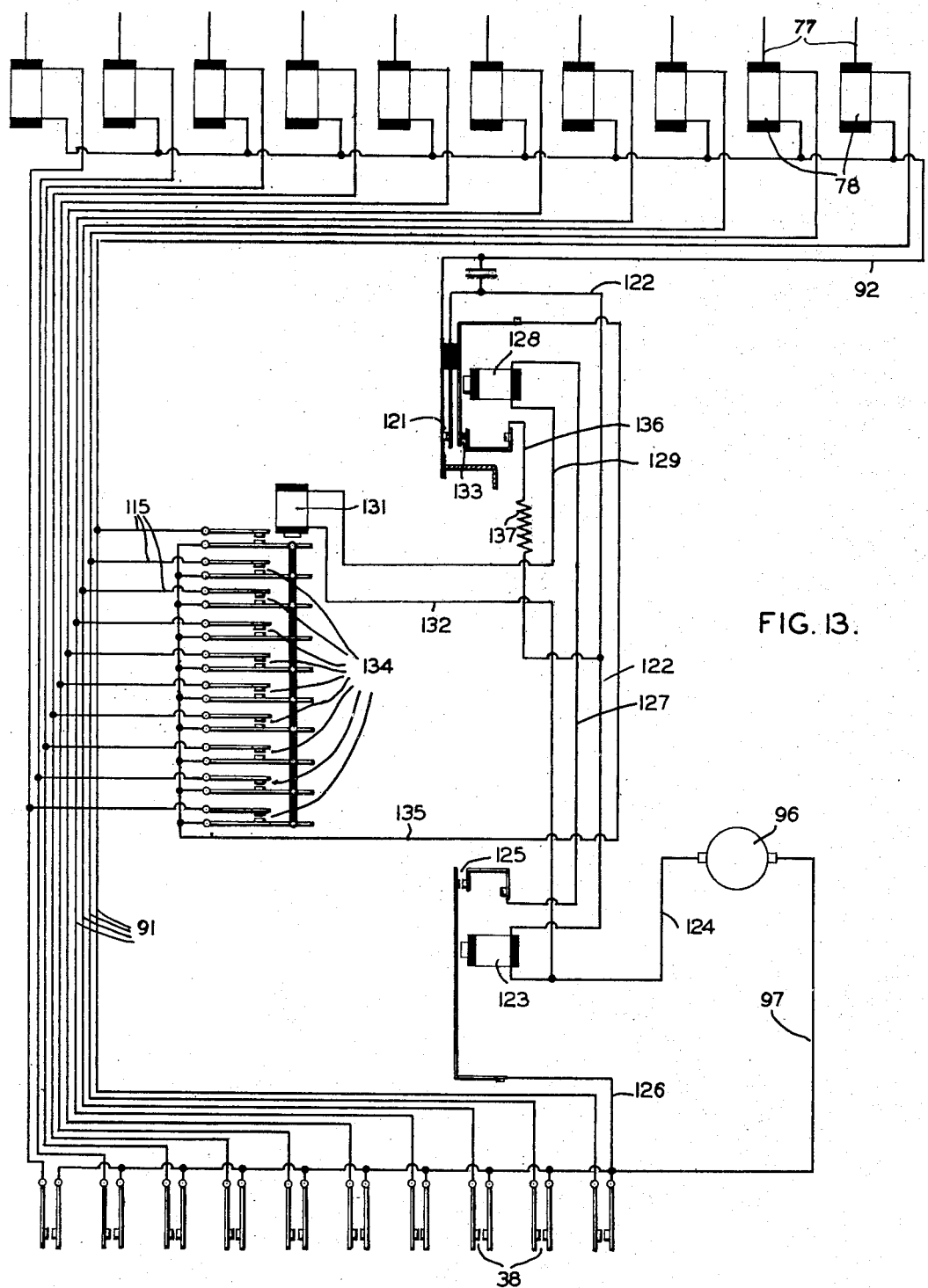

Patented Nov. 1, 1938

2,135,220

UNITED STATES PATENT OFFICE 2,135,220

TYPEWRITER PUNCH COMBINATION

Edwin Roggenstein, Ilion, N. Y., assignor to Remington Rand Inc., Buffalo, N. Y., a corporation of Delaware Application October 3, 1935, Serial No. 43,289

3 Claims. (Cl. 164—113)

This invention relates to typewriter controlled card punching mechanism, and particularly, to mechanism for insuring synchronism between the typewriter and the punch and mechanism for speeding up the operation of the combined mechanism.

In the prior art, it has been customary to operate the Powers punch of the type shown in patents to William W. Lasker, Nos. 1,287,706, 1,305,556, 1,305,557, 1,307,682, 1,311,565, 1,643,779, 1,684,546, 1,695,965, 1,723,242, 1,790,479, 1,807,627, 1,840,515, 1,868,111, 1,883,986, and 1,985,101, by means of mechanism connecting the punch to the keys of the typewriter as shown in patents to Weiland et al. Nos. 1,682,451 and 1,684,001. This mechanism has been found by experience to be highly efficient for the production of both punched cards and a typed record when the speed requirements are moderate. The mechanism constructed according to these disclosures is not, however, adapted to produce punched cards at the maximum speed at which the typist can operate a typewriter and, accordingly, it has been found necessary that the typist maintain a typewriter speed lower than maximum in order to permit the punch and typewriter mechanism to stay in synchronism, and to prevent the punching of incorrect cards.

An object of this invention is to maintain positive synchronism between a card punch and a typewriter mechanism when coupled.

Another object of the invention is to speed up the operation of a card punch mechanism when coupled to and operated from a typewriter keyboard.

Still another object of the invention is to speed up the operation of a card punching mechanism to a speed approximating that of a typewriter while simultaneously maintaining strict synchronism of operation between the typewriter and the punching mechanisms.

A further object of the invention is to actuate the punch controlling mechanism in a minimum length of time and with a minimum duration of current pulse in the actuating magnets.

The device of the invention provides a typewriter-punch hook-up in which a single typewriter mechanism, such as a typewriter-bookkeeping machine, is electrically connected to one or more card punching mechanisms for the production of punched cards containing information typed on a paper record in the typewriter.

The invention provides a key interlock consisting of contacts on the punch carriage which control the current supply to a magnet in the typewriter mechanism, which magnet, in turn, cooperates with the key lock mechanism of the typewriter to prevent the operation of the next succeeding key of the typewriter until the punch carriage has completed its stroke and is ready for operation in the next card column.

The invention further provides a mechanism consisting of a set of relays for limiting the duration of current pulses supplied from the typewriter to the punch mechanism to the minimum pulse duration, which will operate the punch mechanism and thereby allow the withdrawal of the escapement holding pawl in the punch escapement mechanism before the carriage is held by the escapement pawl, thereby permitting the punch carriage to move from one column to the next in a single movement; thus avoiding the slowing up of the punch carriage operation, which otherwise occurs because of the pause in punch carriage movement produced by the holding pawl.

The invention thus consists of a typewriter-key-punch combination in which there is provided means for preventing movement of the next subsequent typewriter key until the punch carriage has completed its travel, and mechanism for limiting the duration of the current pulse supplied from the typewriter to the key-punch in order to speed up the movements of the punch carriage.

Other objects and structural details of the invention will be apparent from the following description when read in connection with the accompanying drawings, wherein:

Fig. 6 is a side view partly in section of the key-punch mechanism.

Fig. 7 is a view partly in section of the punch setting carriage and operating solenoid.

Fig. 8 is a similar view of the carriage in operative position.

Fig. 9 is a similar view of the carriage in fully actuated position.

Fig. 10 is a diagrammatic representation of the key interlock circuits between the bookkeeping typewriter and a single punch mechanism.

Fig. 11 is a diagrammatic representation of circuits connecting the bookkeeping typewriter and two card punching mechanisms.

Fig. 13 is a diagrammatic representation of an alternative circuit arrangement for limiting the duration of current pulses from the typewriter to the key-punch.

Referring to the figures, there is provided a bookkeeping typewriter 20, which may be the standard Remington bookkeeping typewriter or may be any desired form of typewriter. The typewriter 20 is equipped with a series of electric contacts for the operation of a card punching mechanism 21, which may desirably be the well known Powers key-punch as disclosed in the above mentioned patents, except for modifications made for the actuation of the combined devices of this application. The key-punch mechanism may consist of a single punch machine only, or two punch machines may be utilized, controlled in parallel from the typewriter 20, the second key-punch being indicated at 21a. This combination is broadly the framework into which the present invention is incorporated, both the typewriter and the key-punch mechanisms having incorporated therein the new members, elements and circuits of the present invention.

Figure 2:
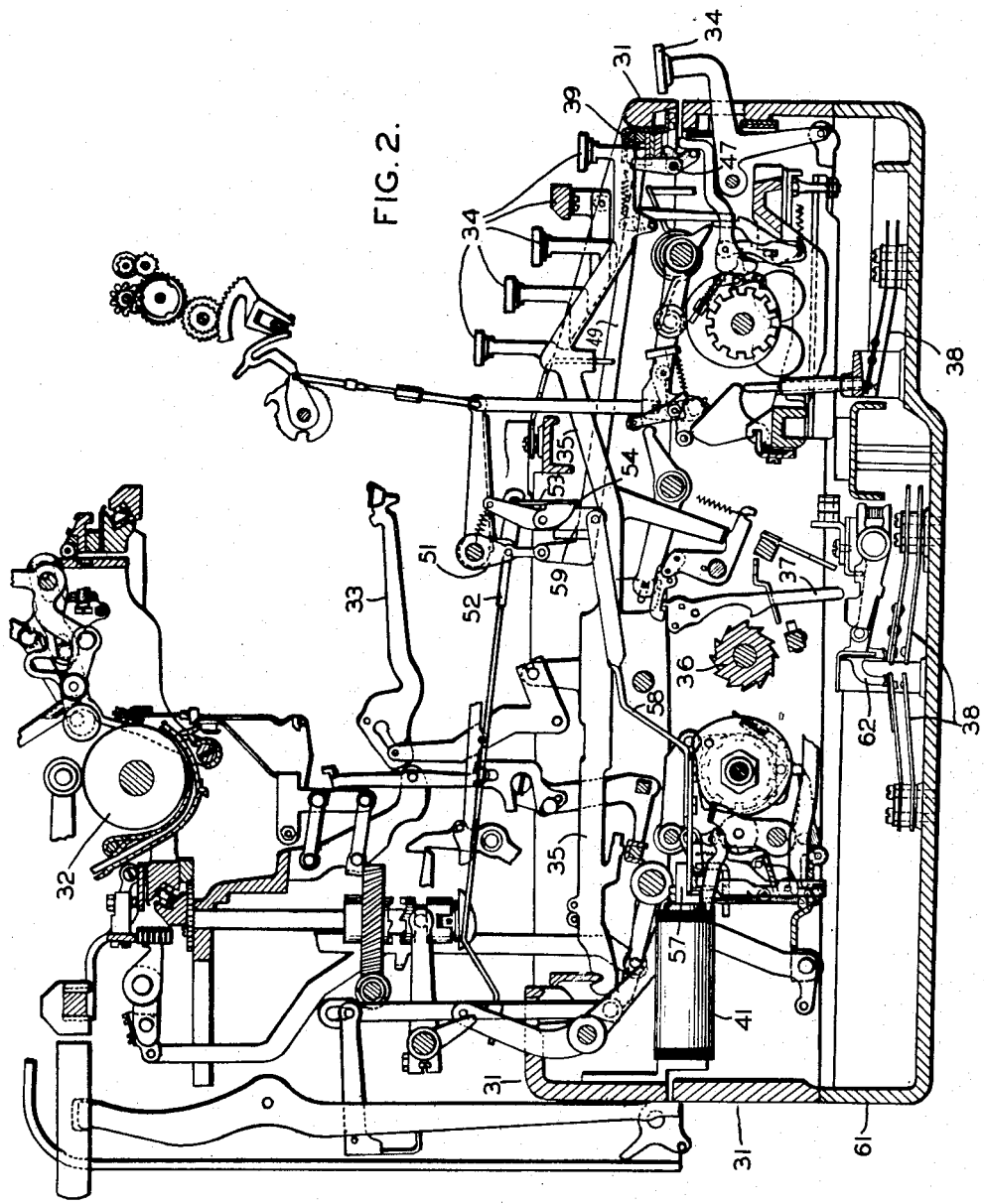
Fig. 2 is a side view partly in section of the typewriter bookkeeping machine, showing the key-lock system and mechanism of the invention.

Fig. 2 shows the site of incorporation of the new members of the present invention into the typewriter bookkeeping machine. As shown, the bookkeeping machine consists of a frame member 31 for the support of the several operating mechanisms including the platen 32, the type levers 33, the keys 34 and their associated key-levers 35, the snatch roll 36, the push rods 37, the key contacts 38, and the key-lock mechanism 39. In addition, there is provided a magnet 41 in the form of a solenoid, likewise supported on the frame.

Figure 3:
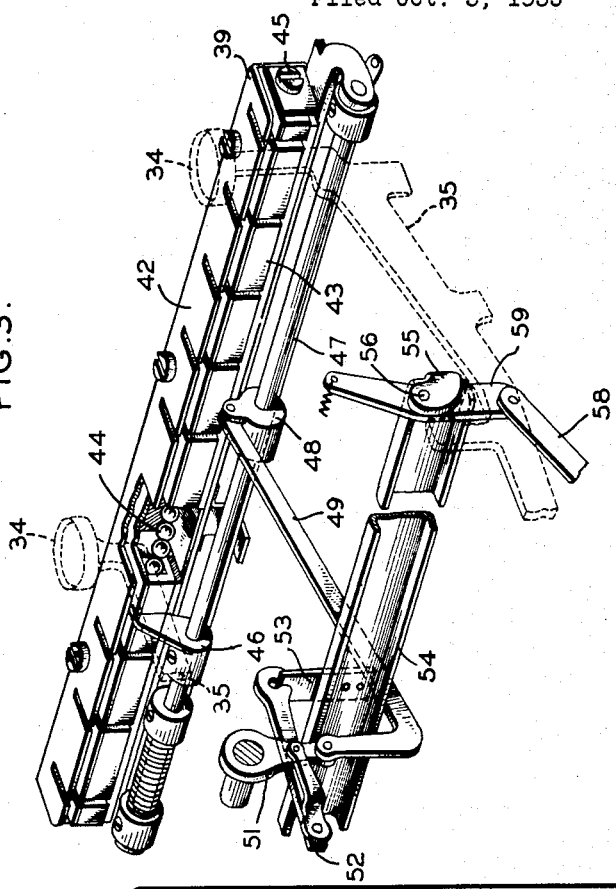
Fig. 3 is a view in orthographic projection of the key-lock mechanism of the typewriter.
Figure 14:
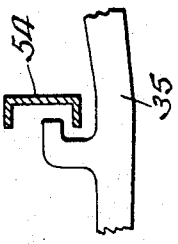
Fig. 14 is a fragmentary detail view showing the relation of two of the members of Fig. 3.

As shown in further detail in Fig. 3, the key-lock mechanism 39 consists of combs 42 and 43 through which some of the key levers 35 are adapted to operate, the digit keys particularly being the ones cooperating directly with the combs 42 and 43. Within the lower comb 43 there is provided a train of steel balls 44 held between end pieces of the comb 43 and an adjusting screw 45. The screw 45 is so set that there is sufficient space between the train of balls 44 for one key lever 35 to enter, but not room for a second key lever to enter. This system effectively serves to prevent the depression of more than one key at a time. In addition, there is provided an auxiliary member 46 which also works through the comb 43 and enters between the balls 44. The member 46 is mounted upon the shaft 47, which is rotated by a lever 48 and link 49 under the drive of another lever 51 which is actuated by a second link 52. The link 52 is coupled to a lever 53, which is attached to a channel member 54 carried by ears 55 on bearings 56 attached to the frame. The channel member 54 cooperates with projections on the alphabetic key levers 35 to prevent operation thereof when the chain of mechanism connected therefrom to the lever 46, in entering between the balls 44 prevents the depression of a key when another key is depressed. A spring on rod 47, shown but not designated in Fig. 3 (of this application) normalizes the levers 46, etc., as is well known in the art, it being shown at 162 in Fig. 9 of the patent to Hart, 1,973,314.

The solenoid core 57 of the magnet 41 has attached thereto a link 58, as shown in Fig. 2, which, as shown in Fig. 3, is connected to a lever member 59 which is attached to the channel member 54. When the magnet 41 is energized to insert the member 46, between the balls 44, none of the digit keys can be operated and also none of the alphabet keys can be depressed.

Figure 1:
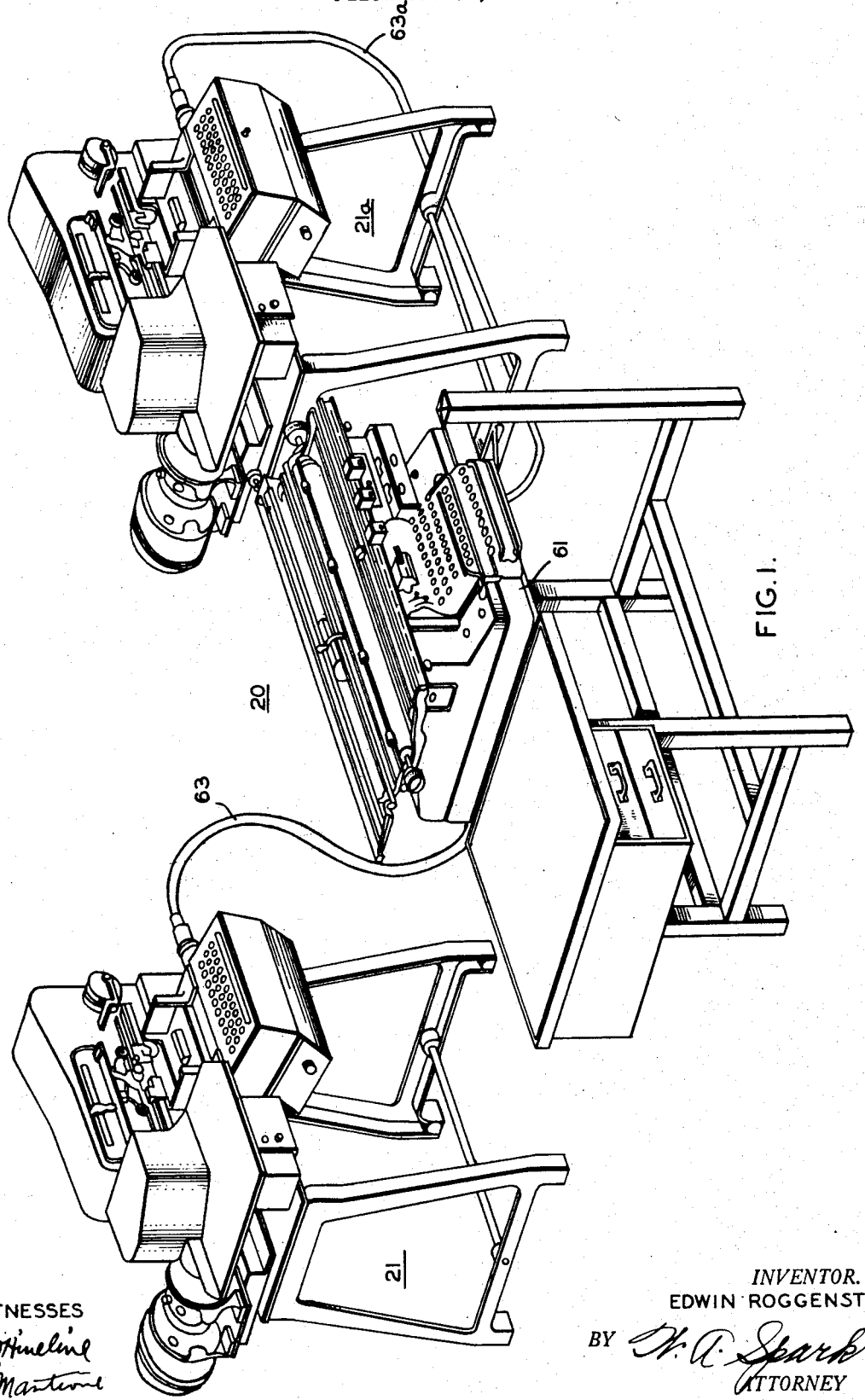
Fig. 1 is a view in isometric perspective of a typewriter-bookkeeping machine in combination with two card punching mechanisms.
Figure 4:
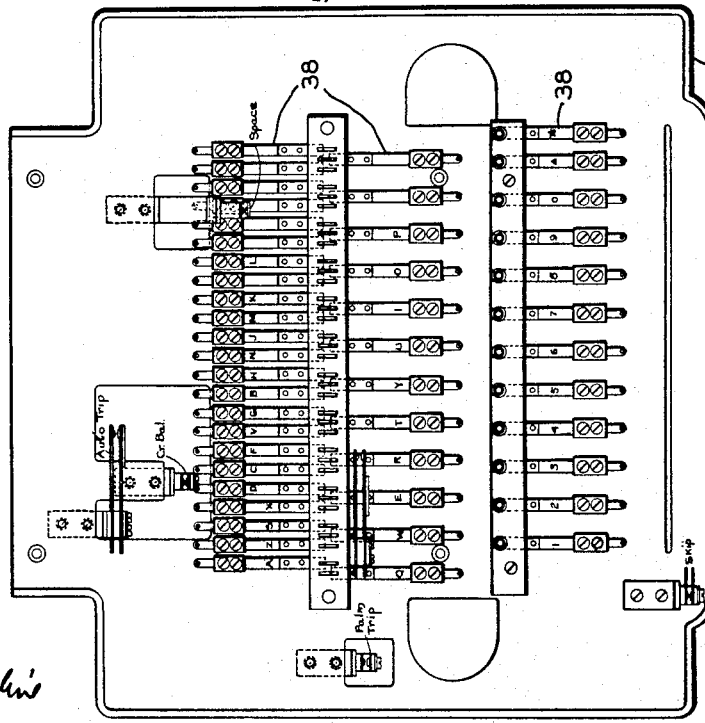
Fig. 4 is a top view of the key contact mechanism associated with the typewriter for the operation of the punching mechanism.

The typewriter is provided with a contact pan 61 as shown in Figs. 1, 2 and 4, within which are positioned the contacts 38, which are operated by the lever members 62 when depressed by the push rods 37 as shown in Fig. 2.

The contact members 38 are connected by cables 63, as shown in Fig. 1, to the card punching mechanism.

The punch mechanism is shown in further detail in Figs. 5 to 9, inclusive, and consists of the usual frame 65 within which is mounted a drive shaft 66 and the various control and operating levers. The blank cards are placed in a card magazine 67 from which they are fed by rolls to the punch chamber 68 under the punches 69. When the punch chamber 68 is raised by the cam and lever mechanism, certain of the punches are driven through the card by the blocking members 71, which are locked by the lock slides 72 after they have been depressed by the carriage mechanism 73.

The blocking members 71, as shown in Figs. 7, 8, and 9, are depressed by members 74 in the carriage 73 when the lever 75 is pushed counter-clockwise by the core 76 of the Bowden wire 77, when the solenoid magnet 78 is energized from closure of the contacts 38 produced by actuation of a key 34 in the typewriter. (Alternatively, the circuits to the solenoid 78 may be closed by the contacts 79 in the keyboard 81.)

Figure 5:
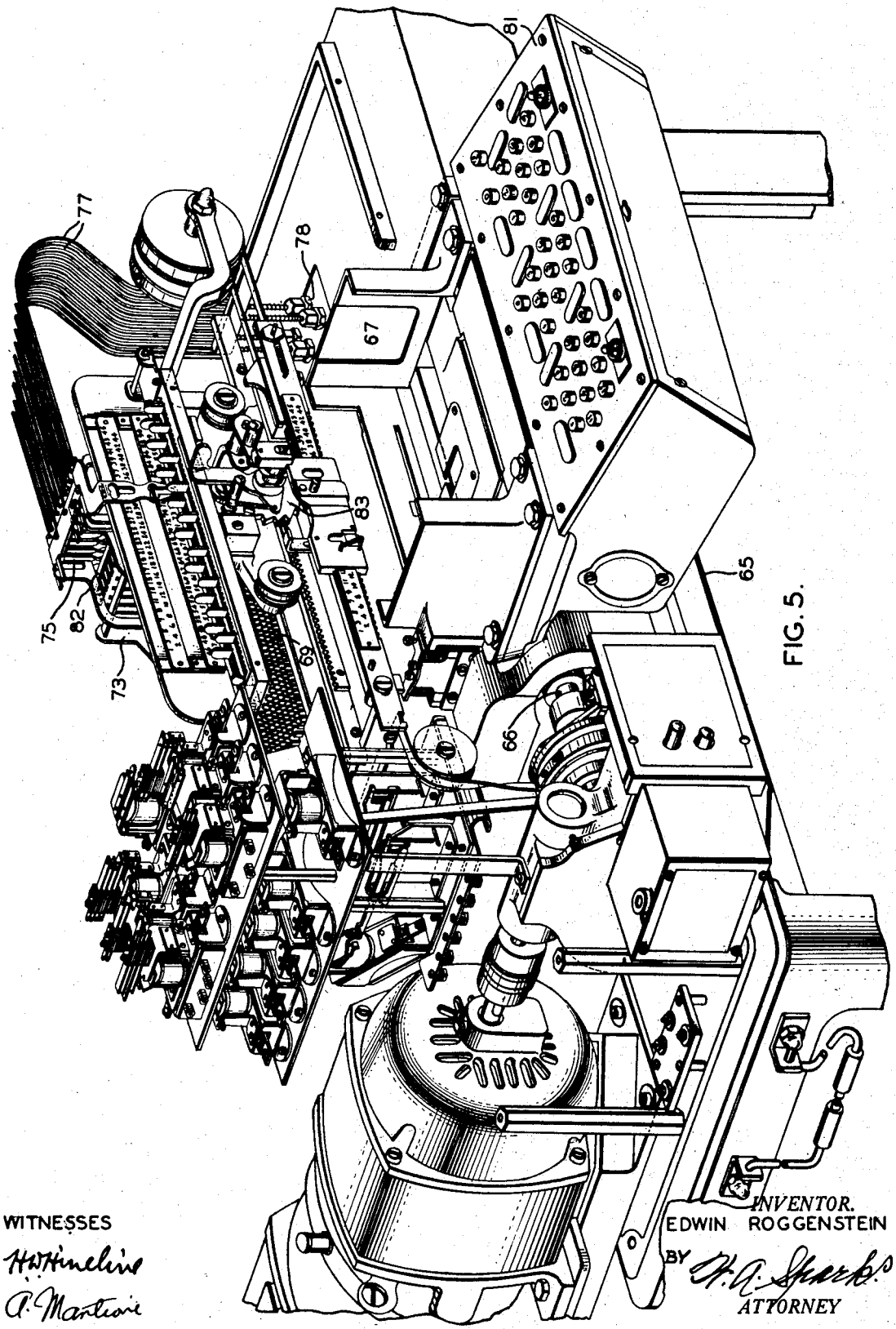
Fig. 5 is a view in orthographic projection of the key-punch mechanism.

Movement of the lever 75 actuates an escapement bail 82 which, in turn, releases the escapement wheel 83, as shown in Fig. 5 to space the carriage to the next column of punch block members (as shown in further detail in such patents as 1,305,557, 1,643,779 or 1,985,101).

When the desired block members have been set over the entire length of the card, the punch driving mechanism is tripped, the punch chamber and die 68 raised to punch the card, and thereafter the card is discharged to the card receiving mechanism, the necessary power for this operation being provided by the motor shown.

Movement of the lever 75 and escapement bail 82 simultaneously moves a contact control lever 84 as shown in Figs. 6 and 7 to close the contacts 85 and 86. As shown in Fig. 10, this closure of the contacts 38, by means of the key lever system, shown in Fig. 2, energizes the solenoid 78 to set a punch blocking member 71 in the punch and simultaneously the contacts 85 and 86 are closed to energize the magnet 41 in the typewriter mechanism, which, in turn, operates the key lock to prevent the operation of another key until the punch setting is completed. This system thus restricts the speed of operation of the typewriter portion of the system, and limits it to the speed which can be maintained by the punch portion of the invention.

This speed limitation, imposed upon the typewriter by the circuit from the punch, serves to maintain strict synchronism between the punch and the typewriter to prevent incorrect perforation of cards. Since, however, maximum possible speed of operation of the combined typewriter-punch combination is desirable, the following system of circuits and relays is provided to increase the speed of the punch setting operation.

As is well known, the punch escapement consists of the ratchet wheel 83, shown in Fig. 5, with which there are two pawls cooperating for the escapement function. When a solenoid magnet 78 is energized, the core of the Bowden wire 77 and the lever 75 are moved and the movement of the lever 75, in turn, moves the bail 82. The escapement pawls are connected to and operated by the bail 82, and the first movement of the bail interposes a holding pawl in the path of a tooth on the escapement wheel 83, and permits the other pawl to pass a tooth. Thereafter, return movement of the bail 82 withdraws the holding pawl and permits the next tooth of the escapement wheel 83 to come up against the main pawl. Thus the carriage movement takes place in two steps with a pause between the successive steps. This pause divides the carriage movement into two increments and the occurrence of the pause between them causes the slowness of the operation of the punch setting mechanism, and both are caused directly by the fact that the current flow through the solenoid 78 occurs for a substantial duration of time, greater than is required for the setting of the blocking members and initiation of the escapement movement.

Figure 12:
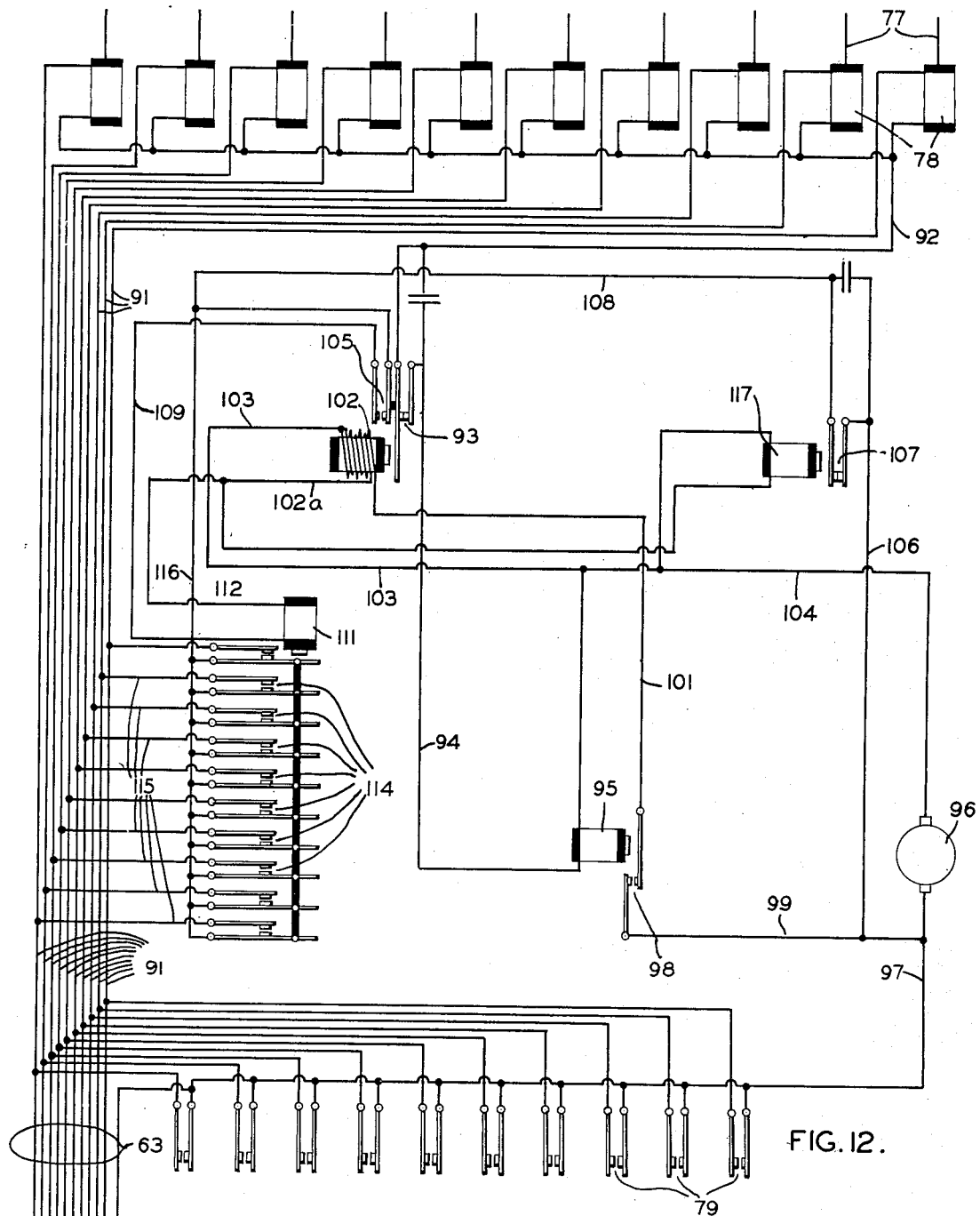
Fig. 12 is a diagrammatic representation of circuits and apparatus for limiting the current pulse delivered from the bookkeeping typewriter to a key-punch.

In order to avoid this slowing down of the carriage movement, the invention provides the circuits and relays shown in Figs. 12 and 13, which are separate from and independent of the circuits and apparatus shown in Figs. 10 and 11, although they cooperate therewith to increase the speed of operation of the punch, while enforcing strict synchronism.

As shown in Fig. 12, the contacts 38 in the typewriter contact pan, and the contacts 79 in the punch keyboard, are connected in parallel to the respective leads 91, which run to the punch setting solenoids 78. The common return lead 92 from the solenoid magnets 78 runs to the contacts 93 from which the lead 94 is run to the terminal of the magnet 95 of a second relay. The other terminal of the relay magnet winding 95 is run to a source of current such as a generator 96, and a common lead 97 is run from the second terminal of the generator 96 to both the contacts 38 and 79. Thus, closure of a contact in either group allows current to flow through the magnets 78 to actuate a Bowden wire 77 and thereby set a blocking member and space the carriage. In order to limit the time duration of current flow through the magnets 78, a chain of relays is interposed. The relay magnet 95 is energized in series with any one or more of the setting magnets 78 and upon energization closes the relay contacts 98, thereby closing the circuit from the generator 96 and lead 97 by way of the lead 99, the contacts 98 and the lead 101 to one winding of a double-winding magnet 102. From the magnet 102 the current flows through the leads 103 and 104 in return to the generator 96. Flow of current in the first winding of the magnet 102 attracts the relay armature associated therewith, opens the contacts 93 and closes the contacts 105. The opening of the contacts 93 opens the circuit to the magnets 78 and deenergizes them after a very brief interval of time. This time interval is determined by the speed of operation of the relay 95—98 and the relay 102—93 and serves to limit the duration of the current pulse in the magnet 78 to the minimum value which will set the blocking members and initiate the carriage spacing movement. The time duration may readily be made sufficiently short to permit of the holding pawl in the escapement being inserted in the path of an escapement tooth, the main pawl released for movement to the next tooth and the holding pawl withdrawn before an escapement wheel tooth strikes it and is halted. Accordingly, the carriage movement may occur in one continuous increment without the intervening pause which otherwise occurs.

In order to prevent the energization of a second magnet before the key which energized the first one has been released, a series of holding magnets are provided. When the contacts 105 are closed, current can flow from the generator 96 by way of leads 97, 99 and 106 through the contacts 107, the lead 108, the contacts 105, the lead 109, to the winding of relay magnet 111, and the lead 112 to an auxiliary winding 102a on the same magnet as the winding 102 and from the same winding through leads 103 and 104 to the generator 96. This current flow holds the contacts 93 open and the contacts 105 closed, and at the same time closes the set of ten contacts 114 associated with the relay magnet 111. These contacts consist of ten or twelve pairs, one lead 115 from each pair running to the respective leads 91 between the key contacts and the solenoids 78, the other contact of each pair being connected to a common lead 116, which, in turn, is connected to the contacts 105 in parallel with the lead 108. Thus, energization of the relay magnet 111 by way of the contacts 105 holds the relay 102, 102a, 93 and 105 energized with the contacts 93 open, thereby preventing any further current flow in any of the magnets 78. The auxiliary relay winding 117 is connected in parallel with the second winding 102a and is energized simultaneously therewith to open the contacts 107. Accordingly, as long as any of the key contacts are held closed after the operation of setting the corresponding punch blocking member, the relay magnets 111, 102, 102a and 117 are held energized, and their respective contacts opened or closed as shown. The magnet 95, being in series with the magnets 78 and the contacts 93, remains deenergized. When the depressed key contact is released and opened, it opens the circuit through the contacts 114, the lead 116, and thereby deenergizes the magnets 102a and 117, releasing their respective contacts preparatory to another operation, which can occur because of the fact that contacts 93 are closed, thereby closing the common return circuit from the magnet 78, and permitting the closure of any desired contact for the operation of another punch setting magnet. It will be observed that this system not only speeds up the punch operation, but it prevents incorrect operation of the punch setting magnets which otherwise results when two keys are struck with too small an interval therebetween. It is found that this system increases the speed of operation of the punch mechanism to substantially that of the typewriter mechanism.

An alternative form of circuit and relay system for speeding up the punch carriage and preventing improper key contact operation is shown in Fig. 13. In this alternative embodiment the typewriter contact keys 38 are shown and, as in the first embodiment, they may be connected in parallel with the contacts controlled from the punch keyboard. They are similarly connected by a lead 97 from the generator 96, and by leads 91, as in the other embodiment, to the magnets 78 which operate the Bowden wires 77 in a similar manner to set the punch blocking members and space the carriage. A common return 92 from the magnets 78 is likewise provided and run to a similar pair of contacts 121 from which a lead 122 runs to the magnet 123 of a relay which has its second terminal connected by a lead 124 to the second terminal of the generator 96.

This system of connections provides a circuit such that, when a key contact 38 is closed, current flows through the magnet 78 to set the punch and space the carriage and in series therewith the current flows through the relay magnet 123 to close a circuit for current to flow from the lead 97 through the lead 126, the contacts 125, the lead 127 to the relay magnet 128, (which operates the contacts 121) from the magnet 128 by way of the lead 129 to the magnet 131 of a third relay and from this magnet by way of a lead 132 and the lead 124 to the second terminal of the generator 96. The flow of current in this circuit, when the contacts 125 are closed, energizes the magnets 128 and 131, thereby opening the contacts 121 to open the circuit through which the contacts 38 supply the magnets 78. This action occurs quickly and limits the flow of current in the magnets 78 to the desired short time duration to permit rapid movement of the punch carriage. Simultaneously, the contacts 133 and 134 are closed. Closure of these two sets of contacts provides a circuit from whichever one of the leads 91 is live because of closure of a contact 38, by way of the lead 135, contacts 133, the lead 136, and resistances 137 to the lead 122, and therefrom through the magnet 123 and lead 124 to the generator 96, thereby providing a holding circuit for the magnet 128, to hold the contacts 121 open as long as the key contact 38 remains closed.

When the contact 38 is opened, all three of the relay magnets 131, 128 and 123 are released and the circuits prepared for the operation of another magnet 78 by closure of the contacts 121.

The device of the invention thus provides mechanism for maintaining strict synchronism between a typewriter and a key controlled punch mechanism carriage by means of mechanism which prevents operation of a typewriter key until the carriage has completed its movement. The mechanism may be used alone or preferably may be used in combination with the other disclosed mechanism for speeding up the operation of the punched card mechanism by limiting the duration of current pulse in the punch setting and carriage spacing mechanisms.

While there are above described but a limited number of embodiments of the invention, it is possible to produce still other embodiments without departure from the inventive concept above disclosed, and it is, therefore, desired that only such limitations shall be imposed on the appended claims as are stated therein, or required by the prior art.

What I claim as new and desire to secure by Letters Patent, is:

1. In a typewriter-key-punch combination, a typewriter having keys, key levers and types, key contacts, and a key locking mechanism, said key punch having a carriage member containing mechanism for causing the punching of data cards, magnets for the operation of said punching mechanism and escapement mechanism and bail, and a synchronizing mechanism comprising contacts on said carriage operable from said escapement bail and a magnet connected to said contacts and adapted to operate said key-locking mechanism to prevent the operation of another typewriter key during setting and spacing operations of said carriage.

2. In a typewriter-key-punch combination, a typewriter having keys, key levers and types, key contacts, and a key locking mechanism, said key punch having a carriage member containing mechanism for causing the punching of data cards, magnets for the operation of said punching mechanism and escapement mechanism and bail, and a synchronizing mechanism comprising contacts on said carriage operable from said escapement bail and a magnet connected to said contacts and adapted to operate said key-locking mechanism to prevent the operation of another typewriter key during setting and spacing operations of said carriage, and mechanisms for limiting the blocking time of said synchronizing mechanism comprising a relay chain having contacts in said punch magnet circuits adapted to be opened for limiting the time duration of current flow to a short period.

3. In a typewriter-key-punch combination, a plurality of key contacts, a plurality of punch setting magnets and connections therebetween, a multi-contact relay having a common contact and a plurality of contacts connected to said key contacts in parallel with said magnets, a common return from said magnets, a relay having contacts connected in said common return and mechanism comprising circuits and relays for opening said common return contacts and closing said multi-contacts after operation of said magnets until said key contacts are opened.

EDWIN ROGGENSTEIN.

CERTIFICATE OF CORRECTION.

Patent No. 2,135,220.                                                November 1, 1938.

EDWIN ROGGENSTEIN.

It is hereby certified that error appears in the printed specification of the above numbered patent requiring correction as follows: Page 1, second column, lines 41 and 46, for the words "orthographic projection" read isometric perspective; and that the said Letters Patent should be read with this correction therein that the same may conform to the record of the case in the Patent Office.

Signed and sealed this 31st day of October, A. D. 1939.

(Seal)

Henry Van Arsdale,
Acting Commissioner of Patents.